(12) United States Patent
Jones et al.

(10) Patent No.: US 12,405,705 B2
(45) Date of Patent: Sep. 2, 2025

(54) SYSTEM AND METHOD FOR PROVIDING AN ARTIFICIAL INTELLIGENCE CONTROL SURFACE FOR A USER OF A COMPUTING DEVICE

(71) Applicant: Google LLC, Mountain View, CA (US)

(72) Inventors: David Matthew Jones, London (GB); Robert Marchant, Richmond (GB); Benjamin Guy Alexander Pawle, London (GB); George Joseph Rickerby, London (GB); Michael Colville, London (GB)

(73) Assignee: GOOGLE LLC, Mountain View, CA (US)

( * ) Notice: Subject to any disclaimer, the term of this patent is extended or adjusted under 35 U.S.C. 154(b) by 101 days.

(21) Appl. No.: 17/626,265

(22) PCT Filed: Jul. 11, 2019

(86) PCT No.: PCT/US2019/041343
§ 371 (c)(1),
(2) Date: Jan. 11, 2022

(87) PCT Pub. No.: WO2021/006906
PCT Pub. Date: Jan. 14, 2021

(65) Prior Publication Data
US 2022/0291789 A1   Sep. 15, 2022

(51) Int. Cl.
*G06F 3/0482*       (2013.01)
*G06F 3/04812*      (2022.01)
(Continued)

(52) U.S. Cl.
CPC ........ *G06F 3/0482* (2013.01); *G06F 3/04812* (2013.01); *G06F 3/0488* (2013.01); *G06F 3/04886* (2013.01)

(58) Field of Classification Search
CPC .. G06F 3/0482; G06F 3/04812; G06F 3/0488; G06F 3/04886; G06F 3/0237;
(Continued)

(56) References Cited

U.S. PATENT DOCUMENTS 8,560,959 B2 * 10/2013 Zaman ................ G06F 3/04842
715/765
8,589,407 B2 * 11/2013 Bhatia ............... G06F 16/24578
709/219

(Continued)

OTHER PUBLICATIONS

International Preliminary Report on Patentability for Application No. PCT/US2019/041343, mailed Jan. 20, 2022, 25 pages.

*Primary Examiner* — Tan H Tran
(74) *Attorney, Agent, or Firm* — DORITY & MANNING P.A.

(57) ABSTRACT

A computing system can include an artificial intelligence system including one or more machine-learned models. The artificial intelligence system can be configured to receive context data and output data descriptive of a plurality of available control actions available for performance by the artificial intelligence system on behalf of a user of the computing system. The computing system can be configured to perform operations including obtaining the context data; inputting the context data into the artificial intelligence system; receiving, as an output of the artificial intelligence system, the data descriptive of the plurality of available control actions available for performance by the artificial intelligence system; and providing, within a user interface for display to a user, an artificial intelligence control surface. The artificial intelligence control surface can include a plurality of user-selectable tiles. The plurality of user-selectable tiles can respectively correspond to the plurality of available control actions.

20 Claims, 10 Drawing Sheets

(51) Int. Cl.
    *G06F 3/0488*     (2022.01)
    *G06F 3/04886*   (2022.01)

(58) Field of Classification Search
    CPC .......... G06N 3/044; G06N 3/08; G06Q 10/10; G06Q 30/02
    See application file for complete search history.

(56) References Cited

U.S. PATENT DOCUMENTS

| | | | |
|---|---|---|---|
| 8,688,698 | B1 | 4/2014 | Black |
| 8,909,513 | B2 * | 12/2014 | Leydon ................ G06F 40/20 704/5 |
| 8,935,631 | B2 * | 1/2015 | Leonard ................ G06F 9/451 715/788 |
| 9,146,129 | B1 * | 9/2015 | Furio ................ G01C 21/3679 |
| 9,841,874 | B2 * | 12/2017 | Gu ...................... G06F 3/04883 |
| 10,409,488 | B2 * | 9/2019 | Paek ................... G06F 3/0481 |
| 11,295,275 | B2 * | 4/2022 | Choi ................... G06F 3/0482 |
| 2006/0156209 | A1 * | 7/2006 | Matsuura ......... H04M 1/72472 714/E11.207 |
| 2011/0202876 | A1 | 8/2011 | Badger et al. |
| 2011/0264645 | A1 * | 10/2011 | Mital ................ G06Q 30/06 715/810 |
| 2013/0080890 | A1 * | 3/2013 | Krishnamurthi ...... G06F 3/0482 715/702 |
| 2013/0297317 | A1 | 11/2013 | Lee et al. |
| 2014/0039792 | A1 * | 2/2014 | Seetharam ......... G01C 21/3697 701/538 |
| 2014/0188956 | A1 * | 7/2014 | Subba ................... G06F 9/453 707/829 |
| 2014/0189592 | A1 * | 7/2014 | Benchenaa ........... G06F 3/0481 715/835 |
| 2015/0095839 | A1 * | 4/2015 | Hombert ................ G06F 16/74 715/781 |
| 2015/0106737 | A1 * | 4/2015 | Montoy-Wilson ...... G06F 9/451 715/745 |
| 2015/0248411 | A1 * | 9/2015 | Krinker ................ G06F 40/14 707/767 |
| 2015/0378982 | A1 | 12/2015 | McKenzie et al. |
| 2016/0055246 | A1 * | 2/2016 | Marcin ............... G06F 16/9535 707/732 |
| 2016/0217784 | A1 | 7/2016 | Gelfenbeyn et al. |
| 2016/0283454 | A1 * | 9/2016 | Leydon ............. G06F 3/0238 |
| 2016/0292217 | A1 * | 10/2016 | Sinha ................. G06F 16/9535 |
| 2016/0352887 | A1 * | 12/2016 | Na ..................... H04M 1/72454 |
| 2017/0075878 | A1 * | 3/2017 | Jon ................... H04M 1/72436 |
| 2017/0098159 | A1 * | 4/2017 | Sharifi ................. G06F 3/0481 |
| 2017/0180294 | A1 * | 6/2017 | Milligan ............... H04L 51/216 |
| 2017/0235439 | A1 | 8/2017 | Lu et al. |
| 2017/0308290 | A1 * | 10/2017 | Patel ................... G06F 3/04817 |
| 2017/0337209 | A1 * | 11/2017 | Schaer ............... G06F 16/9535 |
| 2017/0351342 | A1 * | 12/2017 | Kandur Raja ...... G06F 3/04886 |
| 2017/0357442 | A1 * | 12/2017 | Peterson ............... G06F 9/54 |
| 2017/0357443 | A1 * | 12/2017 | Paek ................... G06F 3/0482 |
| 2018/0018302 | A1 * | 1/2018 | Vasiltschenko ......... G06F 40/47 |
| 2018/0083898 | A1 * | 3/2018 | Pham ................... H04L 51/046 |
| 2018/0136793 | A1 | 5/2018 | Cassidy et al. |
| 2019/0141494 | A1 * | 5/2019 | Gross ................... H04W 4/029 |
| 2019/0214024 | A1 * | 7/2019 | Gruber ................ G06F 16/2457 |
| 2020/0159862 | A1 * | 5/2020 | Kleiner ................ G06F 16/248 |
| 2020/0242303 | A1 * | 7/2020 | Hwang ................. G06F 40/279 |
| 2020/0348822 | A1 * | 11/2020 | Dascola ............... G06F 3/04817 |
| 2020/0371687 | A1 * | 11/2020 | Goodsitt ............. G06F 3/04886 |

\* cited by examiner

SYSTEM AND METHOD FOR PROVIDING AN ARTIFICIAL INTELLIGENCE CONTROL SURFACE FOR A USER OF A COMPUTING DEVICE

PRIORITY CLAIM

This application is based upon and claims the right of priority under 35 U.S.C. § 371 to International Application No. PCT/US2019/041343 filed on Jul. 11, 2019. Applicant claims priority to and the benefit of this application and incorporates all such applications herein by reference in its entirety.

FIELD

The present disclosure relates generally to machine learning and artificial intelligence. More particularly, the present disclosure relates to systems and methods for providing an artificial intelligence control surface for a user of a computing device.

BACKGROUND

Artificial intelligence and machine learning has been used to assist users of computing devices, for example by providing artificial intelligence agents and personal assistants. Interfacing with such artificial intelligence agents, however, has been slow and cumbersome. For example, certain existing personal assistants respond only to a specific, limited set of verbal commands, and this set of commands may not sufficiently enable a full range of possible interactions between the user and the personal assistant. Accordingly, an improved interface for interfacing with an artificial intelligence agent of a user computing device, such as a mobile computing device, would be welcomed in the art.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include one or more processors and an artificial intelligence system that includes one or more machine-learned models. The artificial intelligence system can be configured to receive context data and, in response to receipt of the context data, output data descriptive of a plurality of available control actions available for performance by the artificial intelligence system on behalf of a user of the computing system. The computing system can include one or more non-transitory computer-readable media that collectively store instructions that, when executed by the one or more processors, cause the computing system to perform operations. The operations can include obtaining the context data and inputting the context data into the artificial intelligence system. The operations can include receiving, as an output of the artificial intelligence system, the data descriptive of the plurality of available control actions available for performance by the artificial intelligence system. The operations can include providing, within a user interface for display to a user, an artificial intelligence control surface that comprises a plurality of user-selectable tiles. The plurality of user-selectable tiles can respectively correspond to the plurality of available control actions.

Another example aspect of the present disclosure is directed to a method for providing an artificial intelligence control surface for a computing device. The method can include obtaining, by one or more computing devices, context data and inputting, by the one or more computing devices, the context data into an artificial intelligence system. The artificial intelligence system can include one or more machine-learned models. The artificial intelligence system can be configured to receive the context data and, in response to receipt of the context data, output data descriptive of a plurality of available control actions available for performance by the artificial intelligence system on behalf of a user. The method can include receiving, by the one or more computing devices and as an output of the artificial intelligence system, the data descriptive of the plurality of available control actions available for performance by the artificial intelligence system. The method can include providing, by the one or more computing devices and within a user interface for display to a user, an artificial intelligence control surface that comprises a plurality of user-selectable tiles. The plurality of user-selectable tiles can respectively correspond to the plurality of available control actions.

Another example aspect of the present disclosure is directed to one or more non-transitory computer-readable media that collectively store instructions that, when executed by one or more processors, cause a computing system to perform operations. The operations can include obtaining context data and inputting the context data into an artificial intelligence system that includes one or more machine-learned models. The artificial intelligence system can be configured to receive the context data and, in response to receipt of the context data, output data descriptive of a plurality of available control actions available for performance by the artificial intelligence system on behalf of a user of the computing system. The operations can include receiving, as an output of the artificial intelligence system, the data descriptive of the plurality of available control actions available for performance by the artificial intelligence system. The operations can include providing, within a user interface for display to a user, an artificial intelligence control surface that comprises a plurality of user-selectable tiles. The plurality of user-selectable tiles can respectively correspond to the plurality of available control actions.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
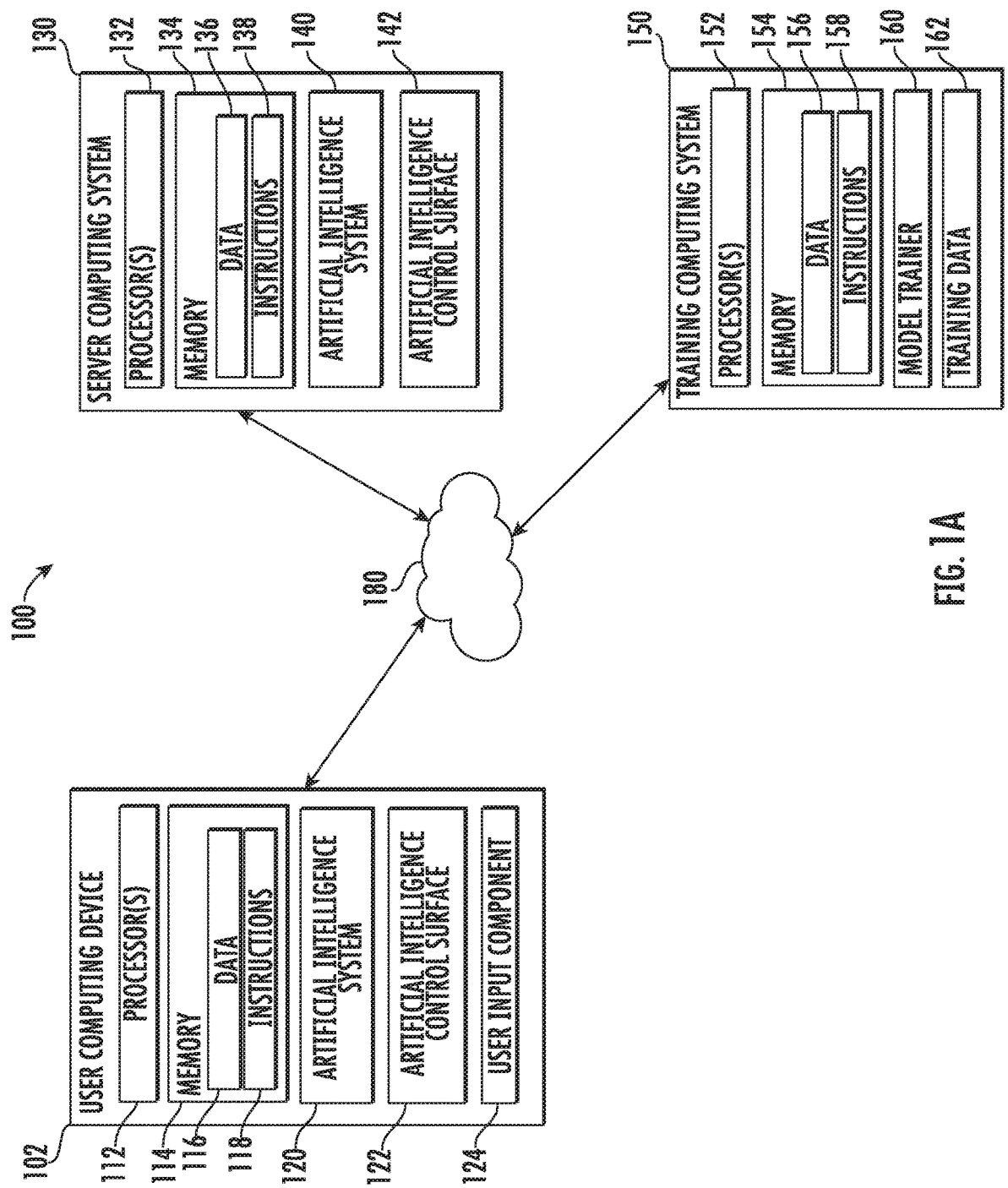
FIG. 1A depicts a block diagram of an example computing system for providing an artificial intelligence control surface for a computing device according to example embodiments of the present disclosure.

Reference numerals that are repeated across plural figures are intended to identify the same features in various implementations.

DETAILED DESCRIPTION

Overview

Generally, the present disclosure is directed to systems and methods including an artificial intelligence system configured to provide an artificial intelligence control surface. The artificial intelligence control surface can include a number of user-selectable tiles that can respectively correspond with a plurality of user-selectable control actions. The control actions can be or include contextually-relevant actions that the artificial intelligence system can perform on behalf of the user or content that the artificial intelligence system can manipulate on behalf of the user (e.g., input into a data entry field). The actions or content can be customized or tailored for the user based on the user's preferences. For example, the artificial intelligence system can read content from a screen of a user device and/or detect other signs or signals from the user to generate the contextually relevant actions for the user. The artificial intelligence system can be trained based on interactions that the user has had with others such that the available control actions can be customized or tailored for the user, for example for message exchanges with others (e.g., by text message, email, etc.).

Importantly, the user can be provided with controls allowing the user to make an election as to both if and when systems, programs, or features described herein may enable collection of user information (e.g., ambient audio, text presented in the user interface, etc.). In addition, certain data may be treated in one or more ways before it is stored or used, so that personally identifiable information is removed. For example, a user's identity may be treated so that no personally identifiable information can be determined for the user. Thus, the user may have control over what information is collected about the user, how that information is used, and what information is provided to the user.

When a tile is selected, the artificial intelligence system can intelligently update the keyboard to replace the selected tile, rearrange the remaining tiles, and/or generate a new collection of tiles based on the contextual information associated with the selected tile. Thus, the artificial intelligence system can provide a dynamic and customized artificial intelligence control surface for the user that can replace traditional QWERTY-style keyboard interfaces.

In some implementations, the user-selectable tiles can be presented in a manner that emphasizes the tile(s) that the artificial intelligence system has selected as more relevant or important to the user. The tiles can be sized and/or arranged within the artificial intelligence control surface based on respective confidences associated with the respective control actions. The user-selectable tiles displaying control actions with the high associated confidences can be arranged in a designated portion of the user interface (e.g., the left side, top side, top left corner, etc.).

Other attributes of the tiles' appearances can be selected or altered based on the respective confidences of the control actions, such as color, shape, font, size, and/or any other suitable aesthetic characteristic. In some implementations, appearances of the most relevant or important tile(s) can be dynamically changed (e.g., can flash, move, or otherwise dynamically change appearance) to emphasize the most relevant tile(s) to the user.

In some implementations, the computing system can display the plurality of tiles in a scrollable control surface hyperplane that virtually extends beyond a viewable area of the user interface. The computing system can detect a user touch action that requests scrolling of the plurality of user-selectable tiles in the user interface. This can allow the user to scroll the hyperplane such that one or more previously hidden user-selectable tiles (e.g., located outside of the user interface and not visible to the user) are moved within the user interface and displayed to the user. Thus, the user can explore the hyperplane to discover additional tiles associated with additional available control actions (e.g., lower confidence actions).

In some implementations, the artificial intelligence system can facilitate an intuitive way for the user to refine the tiles within the user interface. More specifically, the user can request that more tiles be generated and displayed that are similar to one or more of the currently displayed tiles. The computing system can detect a user touch action that requests this refinement action and is directed to one or more tiles in the user interface. In response to detecting this user touch action, the computing system can display one or more additional tiles in the user interface near the selected tile. The additional tile(s) can share one or more characteristics with the selected tile(s). Thus, the computing system can provide the user with the ability to easily refine the available actions presented within the artificial intelligence control surface.

The additional tile(s) and selected tile(s) can share a variety of characteristics. For example, the tiles can include available actions that are semantically similar, visually similar (e.g., for image or videos), directed to locations that are proximate each other, or otherwise similar. For instance, the user can select a tile including a name of a local sushi restaurant, and the computing system can provide additional tiles including names of additional local sushi restaurants.

As another example, the additional tiles can have the same or a similar media type as the tile selected by the user. Examples of media types can include a graphical type (e.g., image, video, gif, etc.), a text type (e.g., generated text message, business name, location name, etc.), a location type (e.g., data describing geographic location information), and/or a composite type that includes two or more media types in a single tile. For instance, the user can select a tile including a generated text message for user in a text message conversation, and the computing system can provide additional tiles including additional generated text messages.

The user can perform a variety of touch actions to request the refinement operation described above. As one example, the user can perform a long press user touch action (e.g., having a duration longer than a threshold duration) to request this refinement operation. In other implementations, the computing system can be configured to perform the refinement operation in response to any suitable user touch action or input, such as double tap, swipe, firm press, voice activated, etc.

In some implementations, the available control actions described by the user-selectable tiles can include one or more control actions available from one or more computer applications that are distinct from the artificial intelligence system. As examples, the available control actions or content can include navigation actions from a navigation application, images from a photography application, scheduling actions from a calendar application, and so forth. More specifically, the artificial intelligence system can (e.g., using an application programming interface (API)) query the computer application(s) and receive one or more application outputs from the computing application(s). The available control action described by the tile(s) can include commanding the computing application(s) to perform an action based on the application output. For instance, one of the tiles can include an available control action that includes reserving a table at a restaurant using a dinner reservation application. If the user selects the tile, the artificial intelligence system can reserve the table with the dinner reservation application on the user's behalf. Alternatively, if the user selects the tile, the computing system can open the dinner reservation application for the user to further explore options or reserve the table.

In some implementations, the user can select a tile to expand the selected tile. The computing system can provide the user with additional information and/or controls within the expanded tile. For example, one of the user-selectable tiles can describe an available action that includes requesting a vehicle using a ride-sharing application. The user can perform a user touch action that requests that this tile be expanded (e.g., a long press, double tap, swipe, etc.). In response to detecting such a user touch action, the computing system can expand the selected tile and provide the user with additional information, such as an estimated travel time, arrival time, cost, etc. The expanded tile can also include additional controls, such as setting a pickup time, changing a pickup location, etc. In the above example about reserving a table, the additional information can include available reservation times, restaurant ratings, menu information, etc., and the additional controls can include selecting a particular reservation time, exploring other restaurants, etc. Thus, the computing system can expand selected tiles to provide additional information and/or controls for the user within the expanded tile that were not previously displayed.

In some implementations, the plurality of user-selectable tiles can include multiple types of available actions. Some tiles can include multimedia objects while others can include generated text and/or combinations thereof. Examples of multimedia objects include hyperlinks, images, videos, and/or location markers that describe physical locations. For instance, at least one of the media types can include an animated image rendered in animation in the user interface (e.g., a Graphics Interchange Format (GIF) image). The text can be generated by the artificial intelligence system, such as a response to received message, a title for a calendar event, or any other type of text.

In some implementations, one or more of the user-selectable tiles can include both a multimedia object and a generated text object. The generated text object can provide context information with respect to the multimedia object based on the context data. The generated context information can be descriptive of at least one of the following with respect to the multimedia object: a user preference, a preference of a contact of the user, a suggested action, and/or a current status. For instance, the multimedia object can include data descriptive of a restaurant, such as a name, image, physical location, etc. The generated text object can include a statement with the restaurant's name, location, and/or image based such as "I love," "I go here all the time," "[User's contact] might like," "Guilty pleasure," etc. Thus, one or more of the tiles can be a "composite" tile including a multimedia object and the generated text object providing context with respect to the multimedia object.

The artificial intelligence system can be particularly useful for entering information into a data entry field, for example when composing a message (e.g., text message or email). In such instances, the context data can include at least a portion of a received message for the user and/or a portion of a message being composed by the user. The computing system can detect a presence of the data entry field (e.g., a message entry field for composing a text message, email, naming a calendar event, etc.) within the user interface. In response to detecting the presence of the data entry field within the user interface, the computing system can provide the plurality of user-selectable tiles within the user interface for selection by the user. The user can scroll through the plurality of tiles and select one or more of the tiles to insert the content of the tile into the data entry field. In response to a user touch action selecting a tile, the computing system can insert the content into the data entry field (e.g., to send in a message to a third party). Thus, the artificial intelligence system can aid the user in composing a message (e.g., a response).

In some implementations, the operations can be performed automatically without a user input that requests performance of the operations. For example, the user selectable tiles can be updated in response to changed circumstances or contexts without user input requesting that the plurality of tiles be generated. As examples, the artificial intelligence system can automatically generate one or more new tiles based on a time of day, an upcoming calendar event, a newly received message, detected ambient audio, and/or the like.

The artificial intelligence system can include or leverage one or more machine-learned models to generate data descriptive of a plurality of available control actions. The machine-learned model(s) can be configured to receive context data. In response to receipt of the context data, the machine-learned model(s) can output data descriptive of a plurality of available control actions available for performance by the artificial intelligence system on behalf of a user of the computing system. The artificial intelligence system can display the user-selectable tiles in the artificial intelligence control surface to provide the available actions for selection by the user.

The context data discussed herein can include a variety of information, such as information currently displayed in the user interface, information previously displayed in the user interface, information gleaned from the user's previous actions (e.g., text written or read by the user, content viewed by the user, etc.), and/or the like. The context data can include user data that describes a preference or other information associated with the user and/or contact data that describes preferences or other information associated with a contact of the user. Example context data can include a message received by the computing system for the user, the user's previous interactions with one or more of the user's contacts (e.g., a text message mentioning a user preference for a restaurant or type of food), previous interactions associated with a location (e.g., going to a park, museum, other attraction, etc.), a business, etc. (e.g., posting a review for a restaurant, reading a menu of a restaurant, reserving a table at a restaurant, etc.), and/or any other suitable information about the user's preferences or user. Further examples include audio played or processed by the computing system, audio detected by the computing system, information about the user's location (e.g., a location of a mobile computing device of the computing system), and/or calendar data. For instance, context data can include ambient audio detected by a microphone of the computing system and/or phone audio processed during a phone call. Calendar data can describe future events or plans (e.g., flights, hotel reservations, dinner plans etc.). Example semantic entities that can be described by the model output can include words or phrases recognized in the text and/or audio. Additional examples can includes information about the user's location, such as a city name, state name, street name, names of nearby attractions, and the like.

The systems and methods of the present disclosure can provide a number of technical effects and benefits. By providing an artificial intelligence control surface, an interface is provided whereby a user can interact with a plurality of control actions available for performance by the artificial intelligence system. In this way, a balance is provided between the convenience of an automatic artificial intelligence generated input, and the control of a manual user generated input. A more efficient mode of input can be provided by allowing the user to interact with a plurality of potential control actions. Further aspects can provide improved user control by generating, in response to a user touch action, one or more additional control actions which are related to a selected icon. In this way, a user can modify and control the plurality of control actions available for performance by the artificial intelligence system, without falling back onto a manual user generated input. Thus, it becomes possible to avoid the situation whereby a suggested artificial intelligence generated input is discarded entirely and a manual user input is generated from scratch, which is wasteful of time and resources for both the system and the user.

The improved and more efficient interface between the user and the artificial intelligence system can enable certain computing resources to be saved, such as, for example, processor usage, memory usage, and/or the like. For example, by providing the user with selectable tiles that enable the artificial intelligence agent to perform certain actions on the user's behalf (e.g., including actions such as interacting with additional applications). Thus, the user is not required to employ the device to perform the actions themselves, thereby saving computing resources as the user will be less efficient in completing the actions. As one example, as described above, the disclosed interface can enable the user to instruct the artificial intelligence agent to interact with a calendar application to insert a new calendar entry onto the user's calendar. Through such improved interaction, the user is not required to separately load the calendar application and spend time creating and editing the calendar event. In such fashion, computing resources required to load and execute the calendar application can be reduced.

As one example, the systems and methods of the present disclosure can be included or otherwise employed within the context of an application, a browser plug-in, as an aspect of an operating system (e.g., as a component of a virtual keyboard supported by the operating system), or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 100 for providing an artificial intelligence control surface according to example embodiments of the present disclosure. The system 100 can includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include an artificial intelligence system 120 including one or more machine-learned models. For example, the machine-learned model(s) can be or include neural networks (e.g., deep neural networks) or other multi-layer non-linear models. Neural networks can include recurrent neural networks (e.g., long short-term memory recurrent neural networks), feed-forward neural networks, or other forms of neural networks.

Example artificial intelligence systems 120 are discussed with reference to FIGS. 2A and 2B.

In some implementations, the artificial intelligence system 120 can be received from the server computing system 130 over network 180, stored in the user computing device memory 114, and the used or otherwise implemented by the one or more processors 112. In some implementations, the user computing device 102 can implement multiple parallel instances of the artificial intelligence system 120 or models thereof (e.g., to perform parallel operations across multiple instances of the artificial intelligence system 120 or models thereof).

The user computing device 102 can include one or more user input component 124 that receives user input. For example, the user input component 124 can include a touch-sensitive component (e.g., a touch-sensitive display screen or a touch pad) that is sensitive to the touch of a user input object (e.g., a finger or a stylus). Other example user input components 124 include a microphone, a traditional keyboard, or other means by which a user can enter a communication.

The artificial intelligence system 120 can be configured to provide an artificial intelligence control surface 122 including a number of user-selectable tiles in a user interface of the user input component 124 (e.g., touch-sensitive display screen). The user-selectable tiles can respectively correspond with a plurality of intelligently selected control actions. The control actions can be or include contextually-relevant actions that the artificial intelligence system 120 can perform or content that the artificial intelligence system 120 can manipulate on behalf of the user. The actions or content can be customized or tailored for the user based on the user's preferences. For example, the artificial intelligence system 120 can read content from a screen of a user device (e.g., displayed in the user input component 124) and/or detect other signs or signals associated with the user to generate the contextually relevant actions for the user. The artificial intelligence system 120 can also be trained based on interactions that the user has had with others such that the available control actions can be customized or tailored for the user.

Additionally or alternatively, one or more artificial intelligence systems 140 can be included in or otherwise stored and implemented by the server computing system 130 that communicates with the user computing device 102 according to a client-server relationship. The artificial intelligence system 140 can be configured to provide an artificial intelligence control surface 142. For example, the artificial intelligence systems 140 can be implemented by the server computing system 140 as a portion of a web service. Thus, one or more artificial intelligence systems 140 can be stored and implemented at the user computing device 102 and/or one or more artificial intelligence systems 140 can be stored and implemented at the server computing system 130. For example, the user computing device 102 can access and query the artificial intelligence systems 140 at the server computing system 130 such that available control actions can be displayed in the user interface of the user input component 124 of the mobile computing device 102 based on output from the artificial intelligence systems 140 at the server computing system 130.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more artificial intelligence systems 140. For example, the artificial intelligence systems 140 can be or can otherwise include various machine-learned models such as neural networks (e.g., deep recurrent neural networks) or other multi-layer non-linear models.

The server computing system 130 can train models of the artificial intelligence system(s) 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that can train the machine-learned models of the artificial intelligence system(s) 140 stored at the server computing system 130 or artificial intelligence system(s) 120 stored at the user computing device 102 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In some implementations, if the user has provided consent, the training examples can be provided by the user computing device 102 (e.g., based on communications previously provided by the user of the user computing device 102). Thus, in such implementations, the artificial intelligence system 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the artificial intelligence system 120 can be both trained and used locally at the user computing device 102. In some of such implementations, the user computing device 102 can implement the model trainer 160 to personalize the artificial intelligence system 120 based on user-specific data.

Figure 1B:
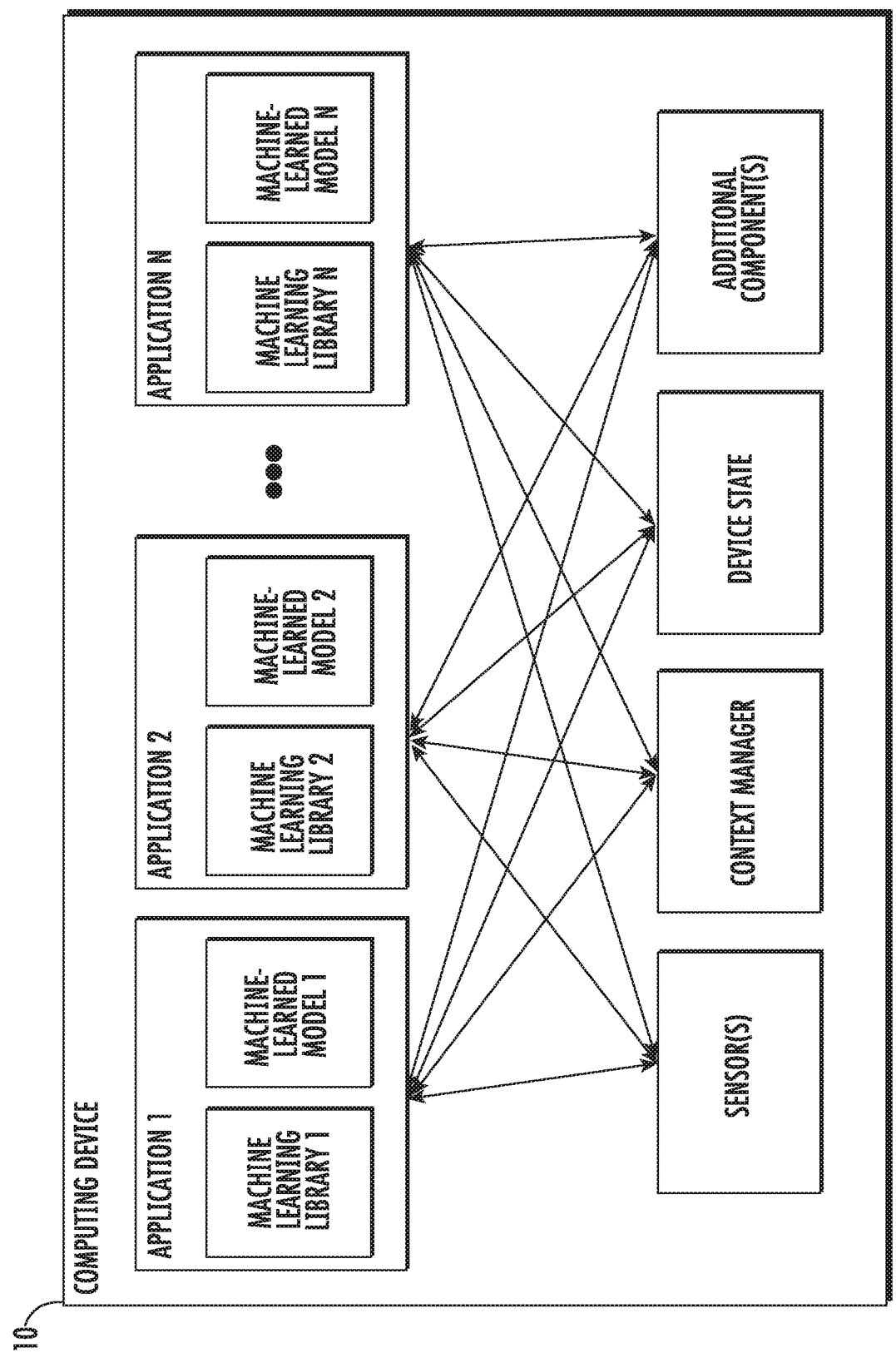
FIG. 1B depicts a block diagram of an example computing device that for providing an artificial intelligence control surface for a computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
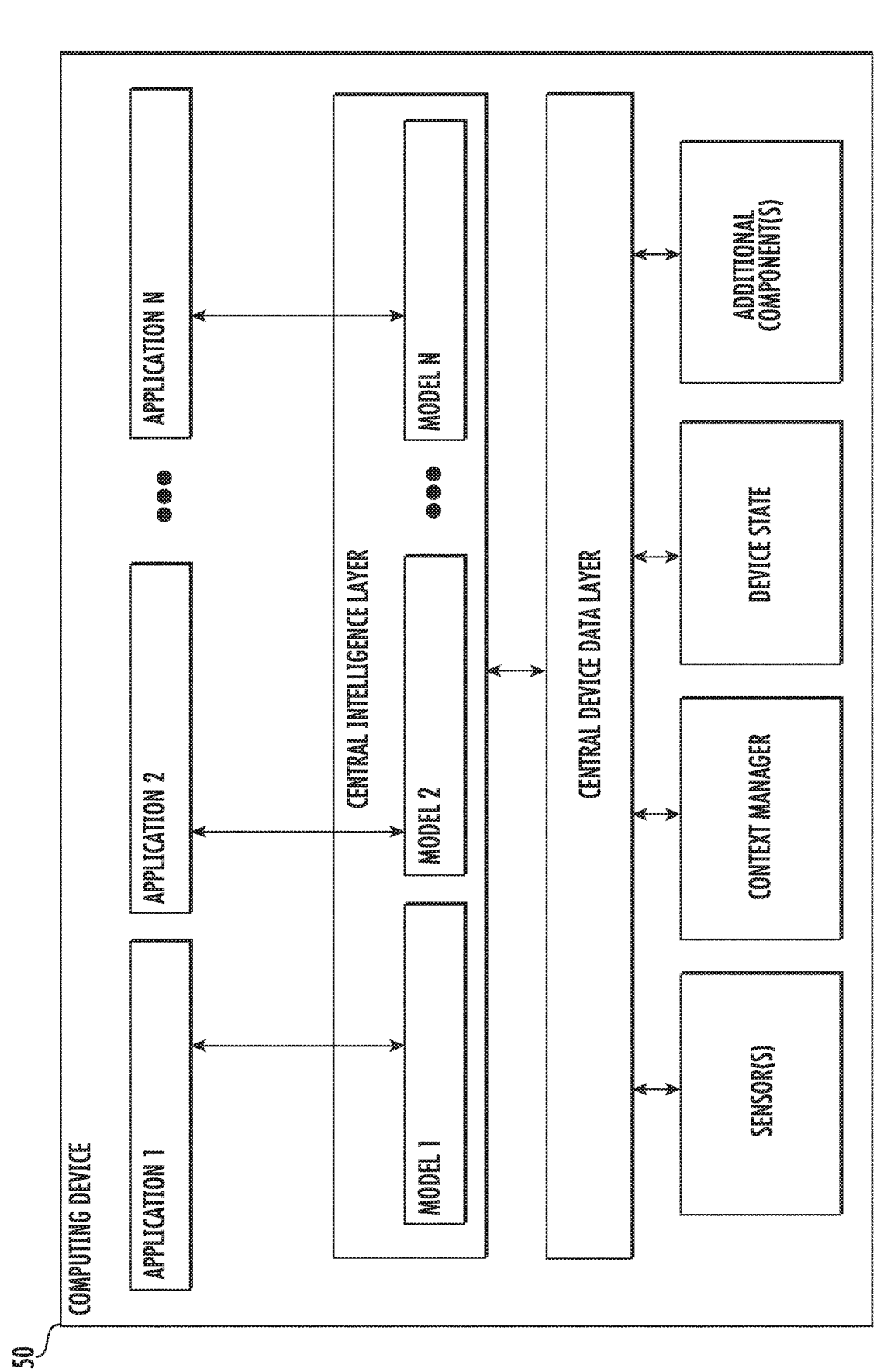
FIG. 1C depicts a block diagram of an example computing device for providing an artificial intelligence control surface for a computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2A:
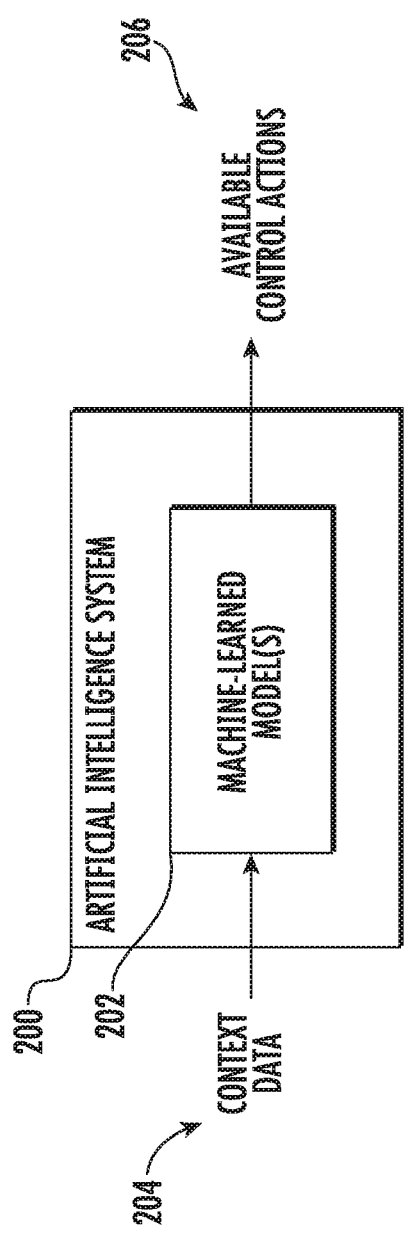
FIG. 2A depicts a block diagram of an example artificial intelligence system including one or more machine-learned models according to example embodiments of the present disclosure.

FIG. 2A depicts a block diagram of an example artificial intelligence system 200 according to example embodiments of the present disclosure. In some implementations, the artificial intelligence system 200 can include one or more machine-learned model(s) 202 that are trained to receive context data 204, and, as a result of receipt of the context data 204, provide data that describes available control actions 206. The context data 204 can include information displayed, detected, or otherwise processed by the computing system and/or information about the user and/or the user's interaction with the user interface. Examples of context data can include text displayed in a user interface, audio played or processed by the computing system, audio detected by the computing system, information about the user's location (e.g., a location of a mobile computing device of the computing system), calendar data, and/or contact data. For instance, context data can include ambient audio detected by a microphone of the computing system and/or phone audio processed during a phone call. Calendar data can describe future events or plans (e.g., flights, hotel reservations, dinner plans etc.). Example semantic entities that can be described by the model output include a word or phrase recognized in the text and/or audio. Additional examples includes information about the user's location, such as a city name, state name, street name, names of nearby attractions, and the like.

The available control actions 206 can include actions available for performance by the artificial intelligence system 200 on behalf of a user of the computing system. For example, the available control actions 206 described by the user-selectable tiles can include one or more control actions available from a computer application that is distinct from the artificial intelligence system 200. As examples, the available control actions 206 or content can include navigation actions from a navigation application, images from a photography application, scheduling actions from a calendar application, and so forth. The computer application(s) can be stored on the user computing device and/or stored remotely (e.g., at a server computing system) and accessed from the user computing device.

Figure 2B:
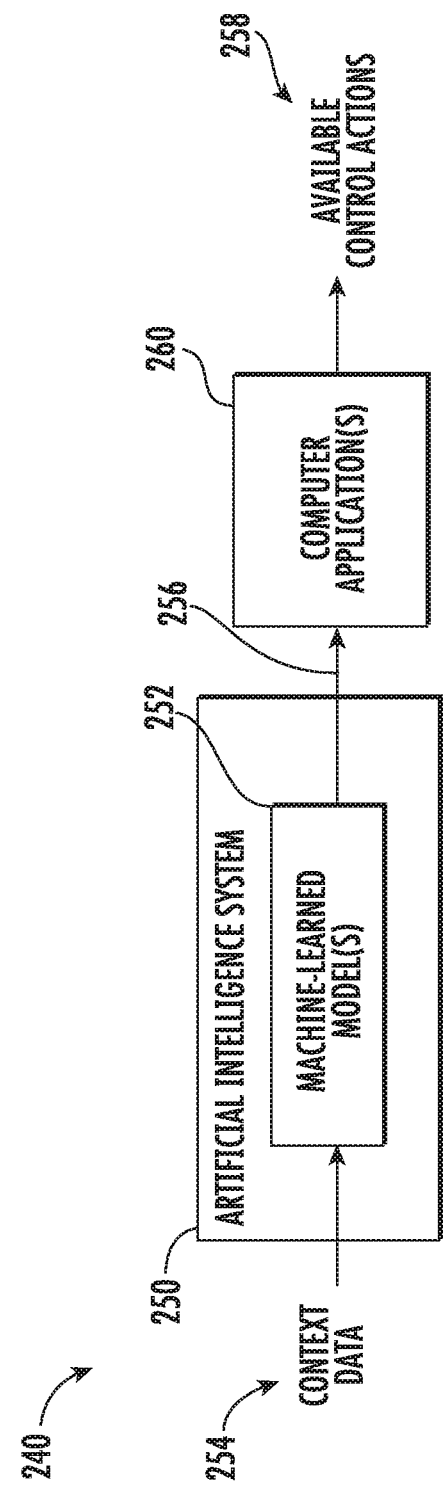
FIG. 2B depicts a block diagram of a computing system including an artificial intelligence system and one or more computer applications.

FIG. 2B depicts a block diagram of a computing system 240 including an artificial intelligence system 250. The artificial intelligence system 250 can include one or more machine-learned model(s) 252 that are trained to receive context data 254, and, as a result of receipt of the context data 254, provide data that describes a request or query 256 for one or more available control actions 258 from one or more computer application(s) 260. The computer application(s) 260 can provide data that describes the available control action(s) 258 in response to receiving the query 256 from the machine-learned model(s) 252.

The available control action 258 can including commanding the computing application(s) 260 to perform one or more actions. For instance, an available control action can include reserving a table at a restaurant using a dinner reservation application. If the user selects the tile providing such an available control action 258, the artificial intelligence system 250 can reserve the table with the dinner reservation application on the user's behalf. Alternatively, the computing system can open the computer application 260 (e.g., dinner reservation application) corresponding with the selected control action 258 for the user to perform the available control action 258 (e.g., reserve a table for dinner).

Figure 3:
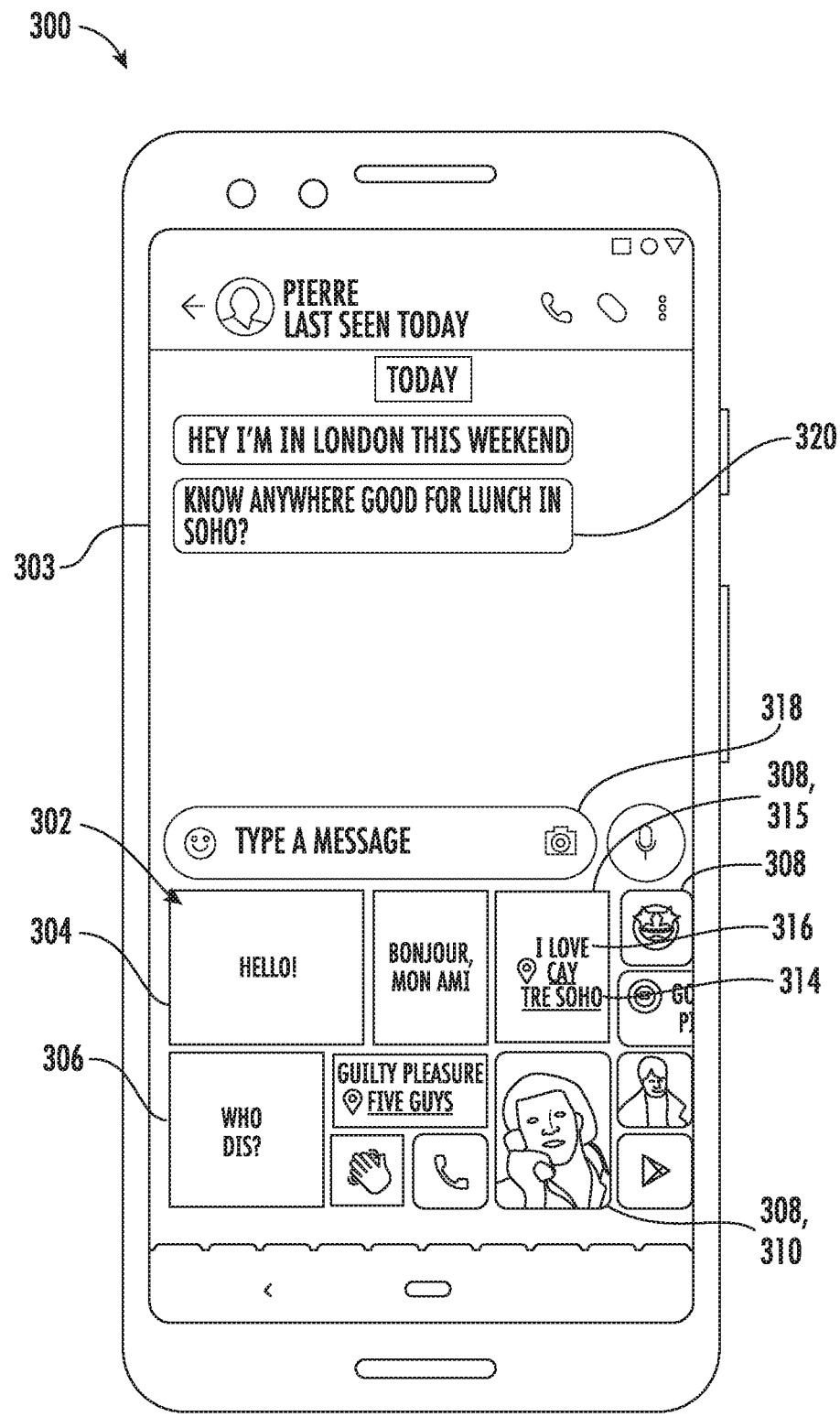
FIG. 3 depicts a computing device including an artificial intelligence control surface according to example embodiments of the present disclosure.

FIG. 3 depicts a computing device 300 including an artificial intelligence control surface 302 within a user interface 303 according to example embodiments of the present disclosure. The artificial intelligence control surface 302 can include a plurality of user-selectable tiles 304, 306 respectively corresponding to a plurality of available control actions.

In some implementations, the user-selectable tiles 304, 306 can be presented in a manner that emphasizes tile(s) that the artificial intelligence system has selected as more relevant or important to the user. The tiles 304, 306 can be sized and/or arranged within the artificial intelligence control surface 302 based on respective confidences associated with the respective control actions.

For example, the user-selectable tiles 304, 306 displaying control actions with the high associated confidences can be arranged in a designated portion of the user interface 303 (e.g., the left side, top side, top left corner, etc.). The plurality of user-selectable tiles 304, 306 can have two or more different sizes. For example a first user-selectable tile 304 can that is larger than a second user-selectable tile 306. The plurality of user-selectable tiles 304, 306 can be sized and/or located in the artificial intelligence control surface 302 (e.g., in the scrollable control surface hyperplane) based on respective confidences associated with the plurality of tiles. Thus, in this example, the user-selectable tile 304 including the text "Hello!" can have the highest confidence, the tile 306 including the text "Who dis?" can have the next highest confidence and so on. In this example, the tiles 304, 306 with the highest confidences are arranged along the left side of the artificial intelligence control surface 302. Tiles 308 having lower associated confidences can be arranged toward the right side of the artificial intelligence control surface 302.

Other attributes of the appearances of the tiles 304, 306, 308 can be selected or altered based on the respective confidences of the control actions, such as color, shape, font, size, and/or any other suitable aesthetic characteristic. In some implementations, appearances of the most relevant or important tile(s) can be dynamically changed (e.g., can flash, move, or otherwise dynamically change appearance) to emphasize the most relevant tile(s) to the user.

In some implementations, the plurality of user-selectable tiles 304, 306, 308 can include multiple types of available actions. Some tiles can include multimedia objects 310 while others can include generated text (e.g., as displayed within tiles 304, 306). Examples of multimedia objects include hyperlinks, images, videos (e.g., rendered in animation in within the respective tile), and/or location markers that describe physical locations. For instance, at least one of the media types can include an animated image rendered in animation in the user interface 303 (e.g., a gif image). The text can be generated by the artificial intelligence system, such as a response to received message, a title for a calendar event, or any other type of text.

In some implementations, one or more of the user-selectable tiles can include both a multimedia object and a generated text object. For example, a tile 315 can include a generated text object 316 can provide context information with respect to a multimedia object 314 based on the context data. The generated text object 316 can include information descriptive of at least one of the following with respect to the multimedia object 314: a user preference, a preference of a contact of the user, a suggested action, and/or a current status. For instance, the multimedia object 314 can include data descriptive of a restaurant, such as a name, image, physical location, etc. In this example, the multimedia object 314 can include a location marker that describes a physical location and/or name of a business, such as a restaurant. As additional examples, the multimedia object 314 can include a link, an image, a video, etc. In this example, the generated text object 316 includes a statement "I love" with the restaurant's name based on the user's preferences. As additional examples, the generated text object 316 could alternatively include "I go here all the time," "[user's contact] might like," "Guilty pleasure," etc. based on the user's preferences, the user's past interactions with the restaurant, and/or the user's past interactions with contact of the user. Thus, one or more of the tiles can be a "composite" tile including both the multimedia object 314 and the generated text object 316, which can provide context with respect to the multimedia object 314.

The artificial intelligence system can be particularly useful for entering information into a data entry field 318, for example when composing a message (e.g., text message or email). In such instances, the context data can include at least a portion of a received message for the user and/or a portion of a message being composed by the user. The computing system can detect a presence of the data entry field 318 (e.g., a message entry field for composing a text message, email, naming a calendar event, etc.) within the user interface 303. In response to detecting the presence of the data entry field 318 within the user interface 303, the computing system can provide the plurality of user-selectable tiles 304, 306, 308 within the artificial intelligence control surface 302 of the user interface 303 for selection by the user. The user can scroll through the plurality of tiles 304, 306, 308 and select one or more of the tiles 304, 306, 308 to insert the content of the selected tile into the data entry field 318. In response to a user touch action selecting one of the tiles 304, 306, 308, the computing system can insert content from the selected one of the tiles 304, 306, 308 into the data entry field 318 (e.g., to send in a message to a third party). Thus, the artificial intelligence system can aid the user in composing a message (e.g., a response).

In some implementations, the operations can be performed automatically without a user input that requests performance of the operations. For example, the user selectable tiles 304, 306, 308 can be updated in response to changed circumstances or contexts without user input requesting that the plurality of tiles 304, 306, 308 be generated or updated. As examples, the artificial intelligence system can automatically and dynamically generate one or more new tiles based on a time of day, an upcoming calendar event, a newly received message, detected ambient audio, and/or the like.

The context data discussed herein can include a variety of information, such as information currently displayed in the user interface 303, information previously displayed in the user interface 303, information gleaned from the user's previous actions (e.g., text written or read by the user, content viewed by the user, etc.), and/or the like. The context data can include user data that describes a preference or other information associated with the user and/or contact data that describes preferences or other information associated with a contact of the user. Example context data can include a message 320 received by the computing system for the user, the user's previous interactions with one or more of the user's contacts (e.g., a text message mentioning a user preference for a restaurant or type of food), previous interactions associated with a location (e.g., going to a park, museum, other attraction, etc.), a business, etc. (e.g., posting a review for a restaurant, reading a menu of a restaurant, reserving a table at a restaurant, etc.), and/or any other suitable information about the user's preferences or user. Further examples include audio played or processed by the computing system, audio detected by the computing system, information about the user's location (e.g., a location of a mobile computing device of the computing system), and/or calendar data. For instance, context data can include ambient audio detected by a microphone of the computing system and/or phone audio processed during a phone call. Calendar data can describe future events or plans (e.g., flights, hotel reservations, dinner plans etc.).

Figure 4:
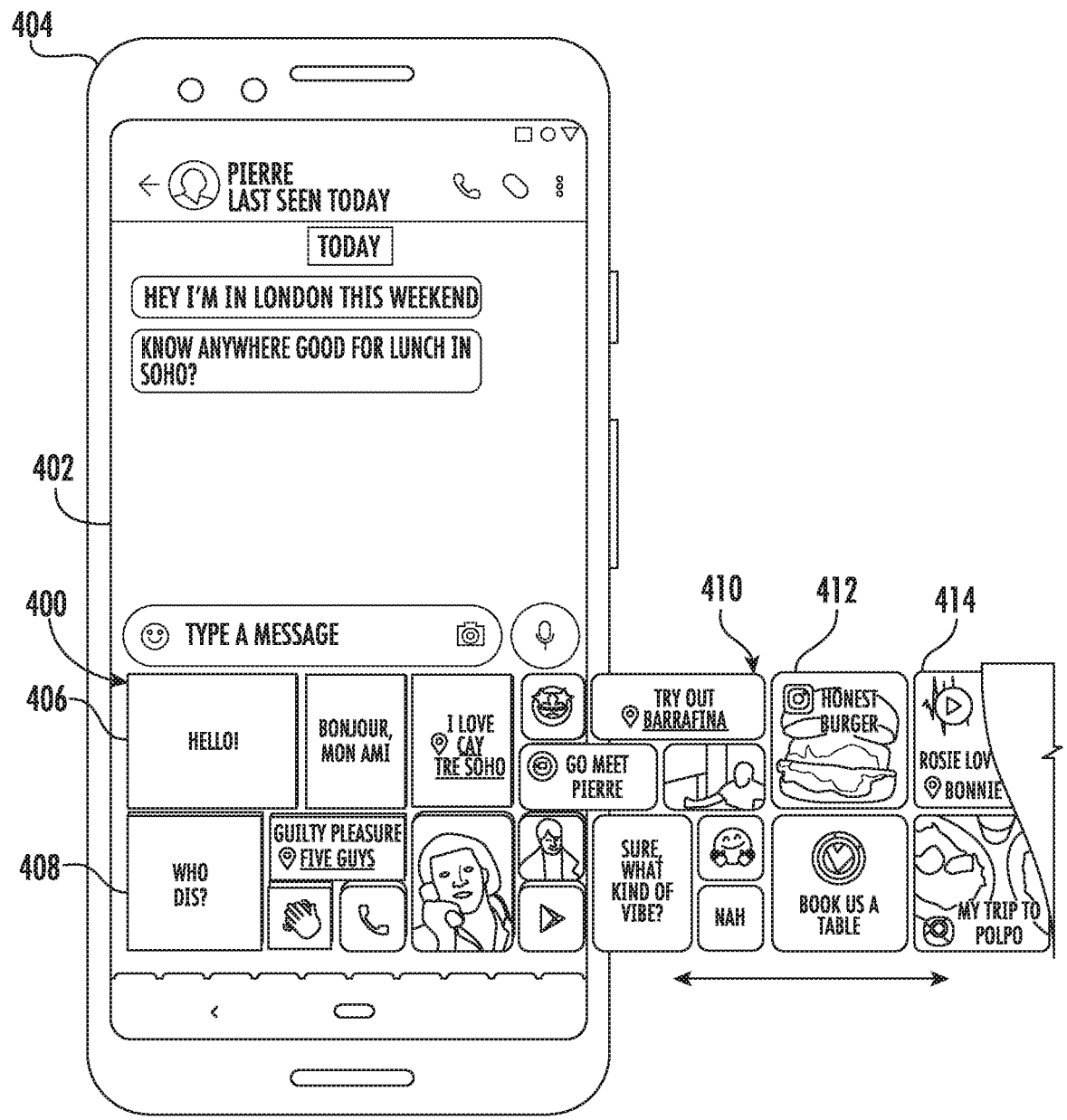
FIG. 4 depicts an artificial intelligence control surface extending beyond a user interface of a user computing device according to example embodiments of the present disclosure.

FIG. 4 depicts an artificial intelligence control surface 400 extending beyond a user interface 402 of a user computing device 404 according to example embodiments of the present disclosure. In some implementations, the user computing device 404 can display a plurality of tiles 406, 408 in a scrollable control surface hyperplane 410 that virtually extends beyond a viewable area of the user interface 402. The computing system can detect a user touch action that requests scrolling of the plurality of user-selectable tiles 406, 408 in the user interface 402. This can allow the user to scroll the hyperplane 410 such that one or more previously hidden user-selectable tiles 412, 414 (e.g., located outside of the user interface 402 and not currently visible to the user) are moved within the user interface 402 and displayed to the user. Thus, the user can explore the hyperplane 410 to discover additional tiles 412, 414 associated with additional available control actions (e.g., lower confidence actions).

Figure 5:
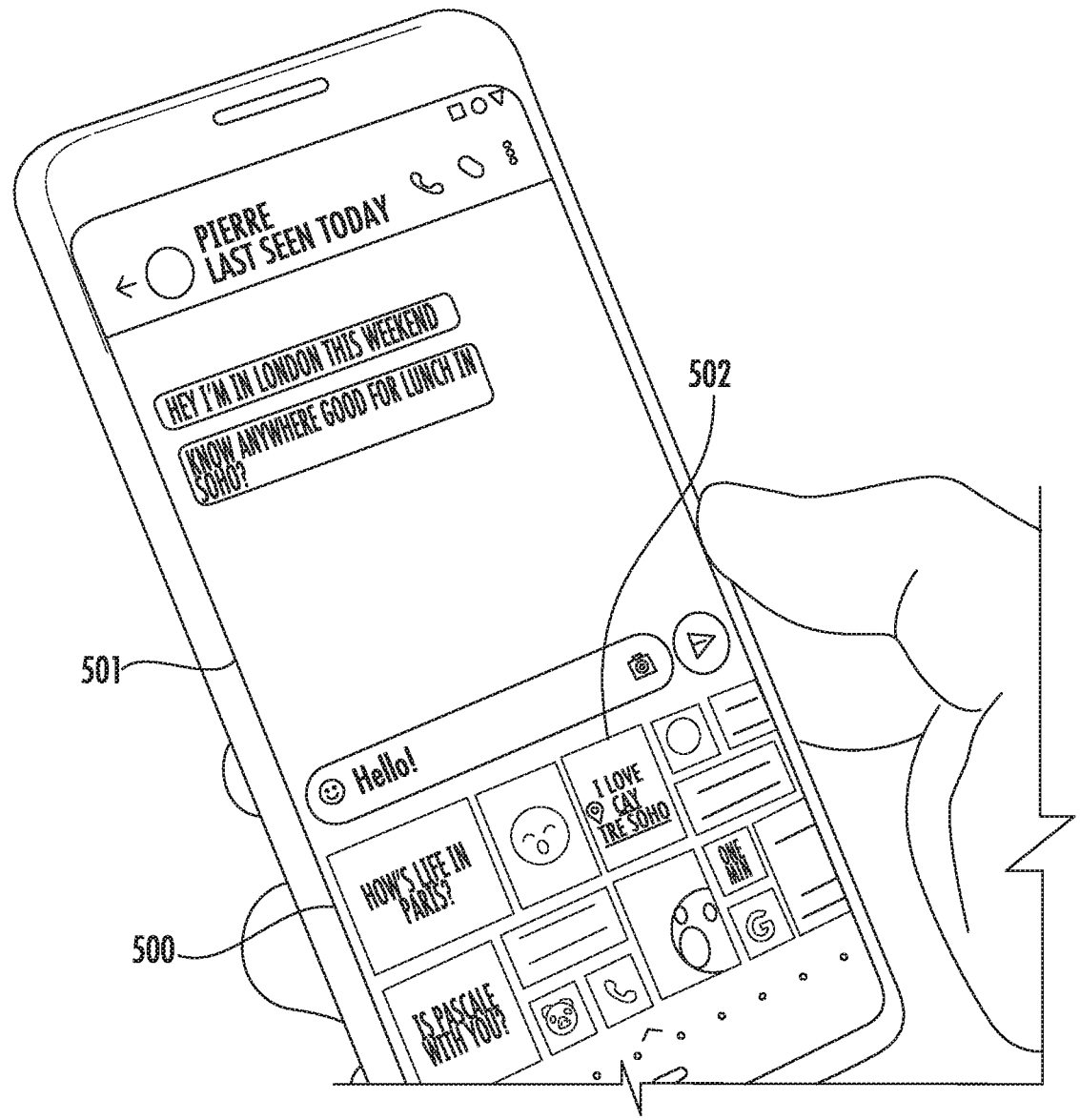
FIG. 5 depicts a user computing device including an artificial intelligence control surface before a refinement action according to example embodiments of the present disclosure.
Figure 6:
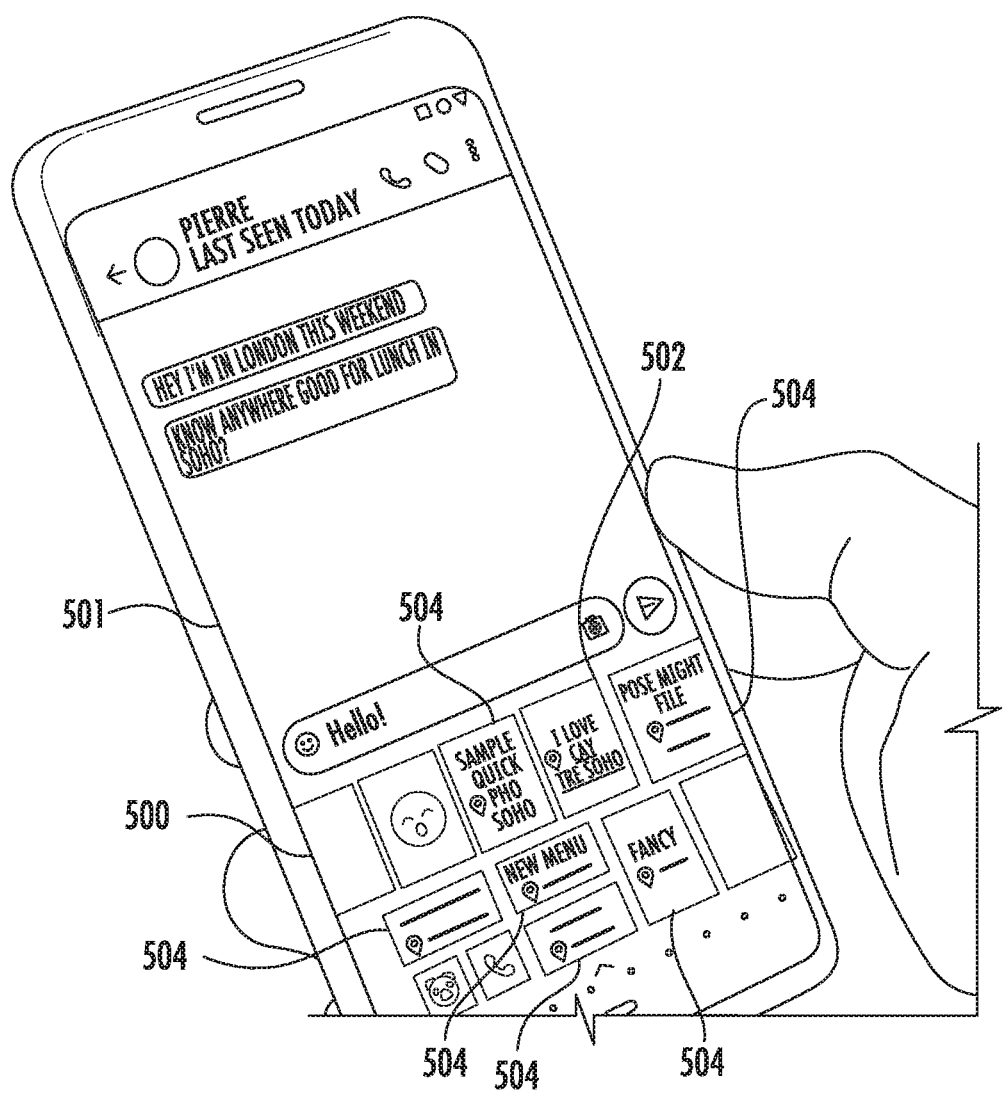
FIG. 6 depicts the user computing device of FIG. 5 after the refinement action according to example embodiments of the present disclosure

Referring to FIGS. 5 and 6, in some implementations, the artificial intelligence system can facilitate an intuitive way for the user to refine tiles that are displayed within an artificial intelligence control surface 500 displayed within a user interface 501. More specifically, FIG. 5 shows the artificial intelligence control surface 500 prior to a refinement action being performed. The user can request that more tiles be generated and displayed that are similar to one or more of the currently displayed tiles 502 by performing a user touch action directed to one of more of the tiles 502. The computing system can detect the user touch action that requests this refinement action.

FIG. 6 illustrates the artificial intelligence control surface 500 after the refinement action has been performed. The computing system can display one or more additional tiles 504 in the artificial intelligence control surface 500 near the selected tile 502. Thus, the computing system can provide the user with the ability to easily refine the available actions presented within the artificial intelligence control surface.

For example, the tiles can include available actions that are semantically similar, visually similar (e.g., for image or videos), directed to locations that are proximate each other, or otherwise similar. For instance, the tile 502 selected by the user can including a name of a local restaurant "Cay Tre Soho," and additional tiles 504 can include information associated with similar restaurants, such as names, locations, links to menus, etc.

As another example, the additional tiles 504 can have the same or a similar media type as the tile selected by the user. Examples of media types can include a graphical type (e.g., image, video, gif, etc.), a text type (e.g., generated text message, business name, location name, etc.), a location type (e.g., data describing geographic location information), and/or a composite type that includes two or more media types in a single tile. For instance, in another example, the user can select a tile including a generated text message for user in a text message conversation, and the computing system can provide additional tiles including additional generated text messages.

The user can perform a variety of touch actions to request the refinement operation described above. As one example, the user can perform a long press user touch action (e.g., having a duration longer than a threshold duration) with respect to the selected tile 502 to request this refinement operation. In other implementations, the computing system can be configured to perform the refinement operation in response to any suitable user touch action or input, such as double tap, swipe, firm press, voice activated, etc.

Figure 7:
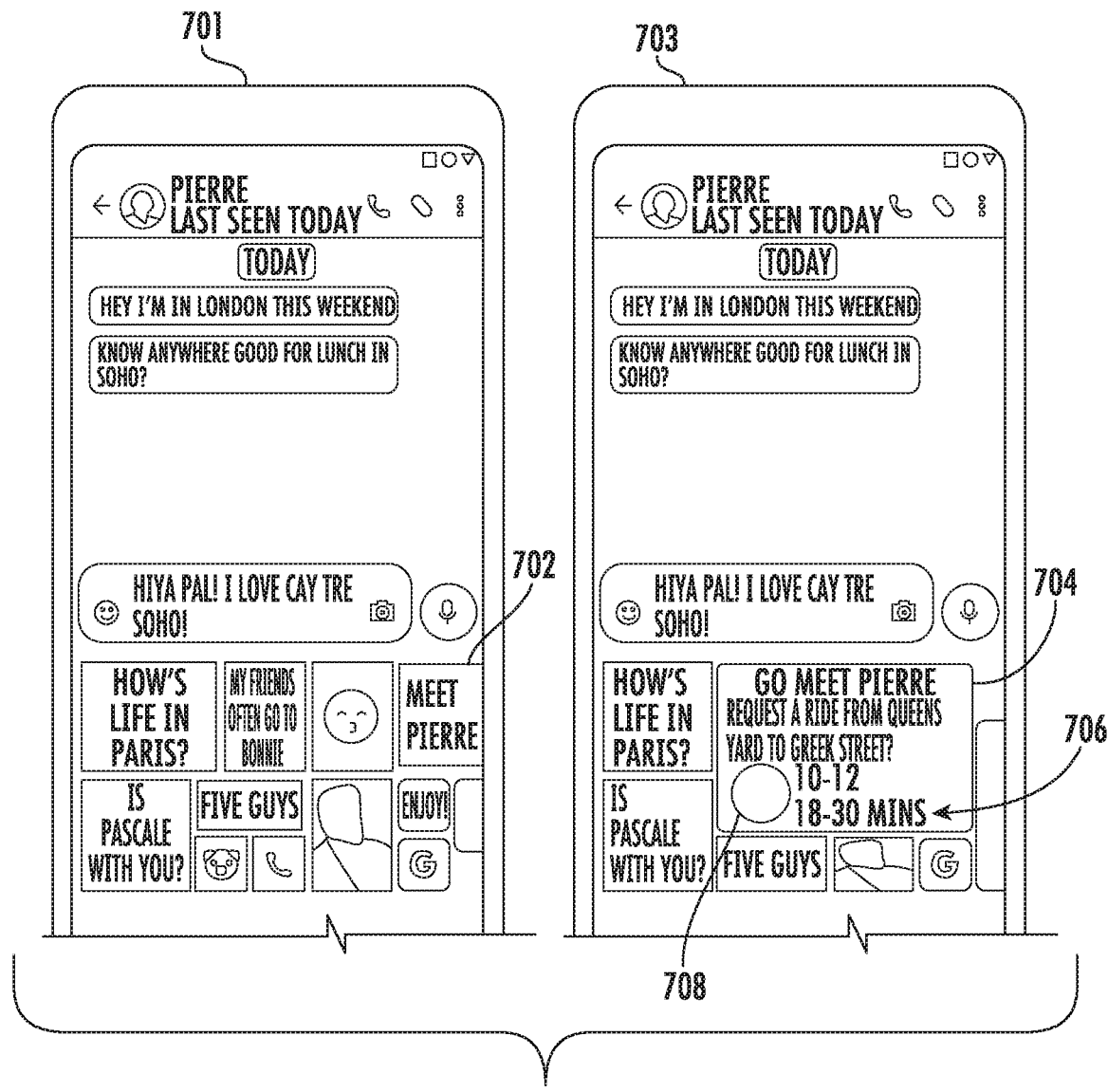
FIG. 7 depicts a user computing device in a first state and a second state in which one of the user selectable tiles has been expanded to portray additional information describing the associated available control action.

Referring to FIG. 7, in some implementations, the user can select a tile 702 to expand the selected tile 702 to view additional information and/or be provided with additional control options. More specifically, FIG. 7 depicts a user computing device in a first state 701 and a second state 703 in which the selected tile 702 has been expanded to portray additional information describing the associated available control action.

Referring to the second state 703 of the computing device, the computing system can provide the user with additional information and/or controls within an expanded tile 704. For example, if the tile 702 (before expansion) describes an available action that includes requesting a vehicle using a ride-sharing application. The expanded tile 704 can provide the user with additional information 706, such as an estimated travel time, arrival time, cost, etc. The expanded tile 704 can also include additional controls 708 associated with the available control action such as setting a pickup time, changing a pickup location, selecting a vehicle or ride-share type etc. For a control action that includes reserving a table at a restaurant, the additional information 706 can include available reservation times, restaurant ratings, menu information, etc., and the additional controls 708 can include selecting a particular reservation time, exploring other restaurants, etc. Thus, the computing system can expand selected tiles to provide additional information 706 and/or controls 708 for the user within the expanded tile that were not previously displayed.

Example Methods

Figure 8:
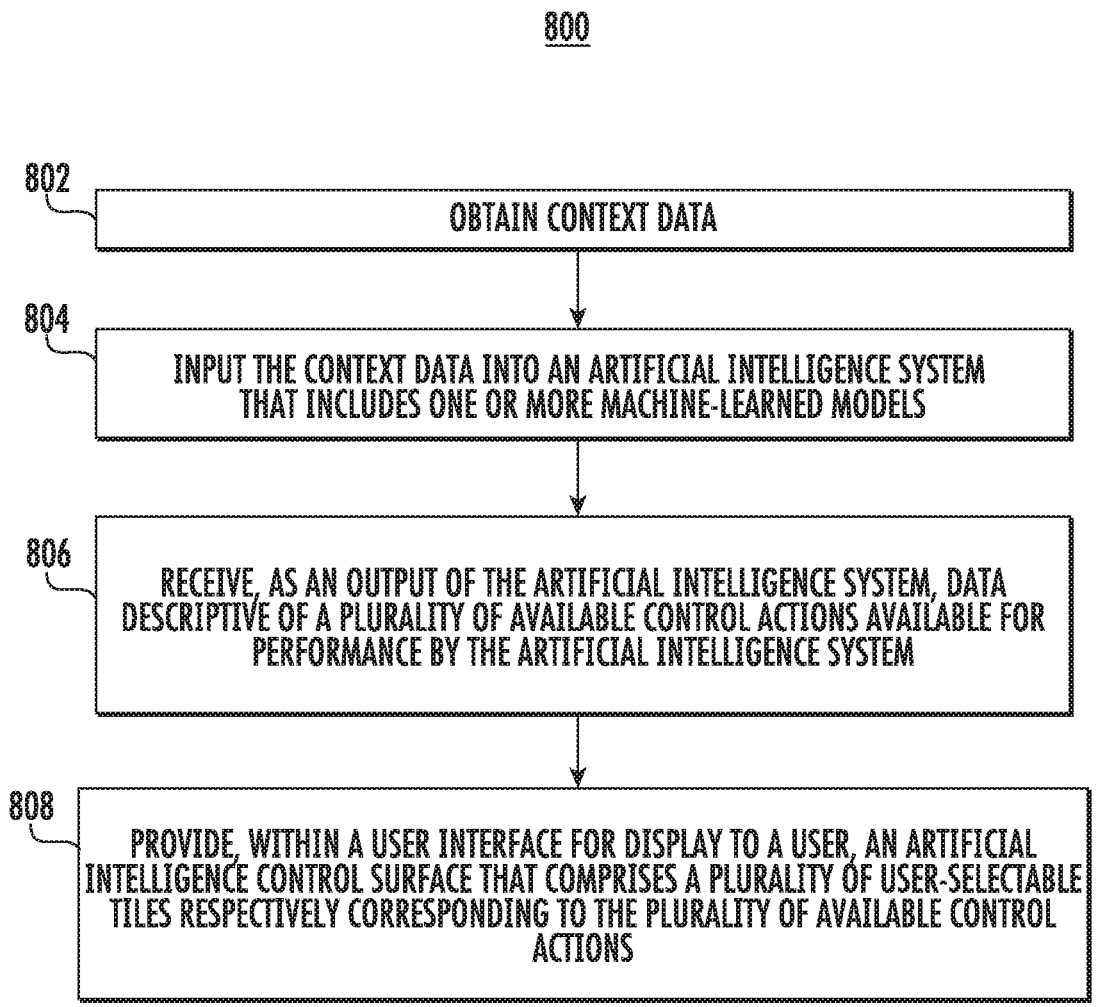
FIG. 8 depicts of a flow chart diagram of an example method for providing an artificial intelligence control surface according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain context data. As discussed herein, the context data can include a variety of information, such as information currently displayed in the user interface, information previously displayed in the user interface, information gleaned from the user's previous actions (e.g., text written or read by the user, content viewed by the user, etc.), and/or the like. The context data can include user data that describes a preference or other information associated with the user and/or contact data that describes preferences or other information associated with a contact of the user. Example context data can include a message received by the computing system for the user, the user's previous interactions with one or more of the user's contacts (e.g., a text message mentioning a user preference for a restaurant or type of food), previous interactions associated with a location (e.g., going to a park, museum, other attraction, etc.), a business, etc. (e.g., posting a review for a restaurant, reading a menu of a restaurant, reserving a table at a restaurant, etc.), and/or any other suitable information about the user's preferences or user. Further examples include audio played or processed by the computing system, audio detected by the computing system, information about the user's location (e.g., a location of a mobile computing device of the computing system), and/or calendar data. For instance, context data can include ambient audio detected by a microphone of the computing system and/or phone audio processed during a phone call. Calendar data can describe future events or plans (e.g., flights, hotel reservations, dinner plans etc.). Example semantic entities that can be described by the model output can include words or phrases recognized in the text and/or audio. Additional examples can includes information about the user's location, such as a city name, state name, street name, names of nearby attractions, and the like.

At 804, the computing system can input the context data into the artificial intelligence system. For example, the computing system can input the context data into one or more machine-learned models of the artificial intelligence system as described above with respect to the machine learned models 202, 252 of FIGS. 2A and 2B.

At 806, the computing system can receive data descriptive of the plurality of available control actions available for performance by the artificial intelligence system as an output of the artificial intelligence system, for example as described above with reference to FIGS. 2A and 2B.

At 808, the computing system can provide an artificial intelligence control surface that comprises a plurality of user-selectable tiles within a user interface for display to a user, for example as described above with reference to FIGS. 3 to 7. The plurality of user-selectable tiles can respectively correspond to the plurality of available control actions.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
one or more processors;
an artificial intelligence system that comprises one or more machine-learned models, the artificial intelligence system configured to receive context data and, based on receipt of the context data, output data descriptive of a plurality of available control actions available for performance by the artificial intelligence system on behalf of a user of the computing system;
one or more non-transitory computer-readable media that collectively store instructions that, when executed by the one or more processors, cause the computing system to perform operations, the operations comprising:
obtaining the context data;
inputting the context data into the artificial intelligence system;
receiving, as an output of the artificial intelligence system, the data descriptive of the plurality of available control actions available for performance by the artificial intelligence system;
providing a user interface for display to a user, wherein the user interface includes a first portion configured to display received messages and sent messages, a second portion configured to display a data entry field for composing messages to potentially be sent, and a third portion configured to display an artificial intelligence control surface that comprises a plurality of user-selectable tiles, the plurality of user-selectable tiles respectively corresponding to the plurality of available control actions, wherein a first user-selectable tile of the plurality of user-selectable tiles includes content automatically generated by the artificial intelligence system based on a received message displayed in the first portion;
based on detecting a first type of a user touch action selecting the first user-selectable tile of the plurality of user-selectable tiles within the third portion of the user interface, generating at least one additional user-selectable tile for display within the third portion of the user interface, the at least one additional user-selectable tile being displayed together with the first user-selectable tile within the third portion of the user interface and at a location proximate to the first user-selectable tile; and
based on detecting a second type of a user touch action selecting the first user-selectable tile, inserting the content from the first user-selectable tile into the data entry field provided within the second portion of the user interface to form part of a message to potentially be sent,
wherein generating the at least one additional user-selectable tile comprises inputting at least one characteristic of the first user-selectable tile into the artificial intelligence system as further context data, and receiving, as a further output of the artificial intelligence system, further data descriptive of at least one further available control action available for performance by the artificial intelligence system, the at least one additional user-selectable tile corresponding to the at least one further available control action.

2. The computing system of claim 1, wherein providing the plurality of user-selectable tiles comprises displaying the plurality of user-selectable tiles in a scrollable control surface hyperplane that virtually extends beyond a viewable area of the user interface.

3. The computing system of claim 2, wherein the plurality of user-selectable tiles are arranged in the scrollable control surface hyperplane based on respective confidences associated with the plurality of user-selectable tiles.

4. The computing system of claim 2, wherein the plurality of user-selectable tiles have at least two different sizes, and wherein the plurality of user-selectable tiles are sized in the scrollable control surface hyperplane based on respective confidences associated with the user-selectable plurality of tiles.

5. The computing system of claim 1, wherein
the first user-selectable tile corresponds to a first point-of-interest,
the at least one characteristic of the first user-selectable tile includes a geographic location of the first point-of-interest and a type of the first point-of-interest, and
the at least one additional user-selectable tile corresponds to a second point-of-interest having a geographic location proximate to the geographic location of the first point-of-interest and is a similar or same type as the first point-of-interest.

6. The computing system of claim 1, wherein
the first type of user touch action comprises a long press user touch action having a duration longer than a threshold duration.

7. The computing system of claim 1, further comprising one or more computer applications, and wherein the artificial intelligence control surface is further configured to query the one or more computer applications and receive at least one application output from at least one of the one or more computing applications, and wherein at least one of the available control actions that respectively correspond with the plurality of user-selectable tiles comprises commanding, by the artificial intelligence system, the one or more computing applications to perform an action based on the application output.

8. The computing system of claim 1, wherein the plurality of user-selectable tiles comprise at least two different media types, the at least two different media types comprising at least one animated image rendered in animation in the user interface.

9. The computing system of claim 1, wherein at least one tile of the plurality of user-selectable tiles comprises a composite tile that comprises each of a multimedia object and a generated text object, the generated text object comprising generated context information generated by the artificial intelligence system with respect to the multimedia object based on the context data.

10. The computing system of claim 9, wherein the multimedia object comprises at least one of
a location marker that describes a physical location;
a link;
an image; or
a video.

11. The computing system of claim 9, wherein the generated context information is descriptive of at least one of the following with respect to the multimedia object:
a user preference;
a preference of a contact of the user;
a suggested action; or
a current status.

12. The computing system of 1, wherein:
providing, within the third portion of the user interface for display to the user, the artificial intelligence control surface that comprises the plurality of user-selectable tiles comprises:
detecting a presence of the data entry field within the second portion of the user interface; and
responsive to detecting the presence of the data entry field within the second portion of the user interface, providing the plurality of user-selectable tiles within the user interface.

13. The computing system of claim 1, wherein providing, within the third portion of the user interface for display to the user, the artificial intelligence control surface that comprises the plurality of user-selectable tiles, is performed automatically without a user input.

14. The computing system of claim 1, wherein the operations further comprise:
updating at least one of the plurality of user-selectable tiles in based on an occurrence of a predetermined event, the predetermined event including at least one of an upcoming calendar event, receipt of a communication from another user, a particular time of day, or detection of ambient audio through a microphone.

15. The computing system of claim 1, wherein the operations further comprise:
detecting a further user touch action selecting at least one other user-selectable tile of the plurality of user-selectable tiles within the third portion of the user interface, the at least one other user-selectable tile including first information and first control actions; and
based on detecting the further user touch action, expanding a size of the at least one other user-selectable tile within the third portion of the user interface such that the at least one other user-selectable tile includes second information and second control actions, greater than the first information and first control actions, respectively.

16. The computing system of claim 1, wherein the context data comprises at least one of:
user data that describes a preference or other information associated with the user; or
contact data that describes preferences or other information associated with a contact of the user.

17. A method for providing an artificial intelligence control surface for a computing device, the method comprising:
obtaining, by one or more computing devices, context data;
inputting, by the one or more computing devices, the context data into an artificial intelligence system that comprises one or more machine-learned models, the artificial intelligence system configured to receive the context data and, based on receipt of the context data, output data descriptive of a plurality of available control actions available for performance by the artificial intelligence system on behalf of a user;
receiving, by the one or more computing devices and as an output of the artificial intelligence system, the data descriptive of the plurality of available control actions available for performance by the artificial intelligence system;

providing, by the one or more computing devices, a user interface for display to a user, wherein the user interface includes a first portion configured to display received messages and sent messages, a second portion configured to display a data entry field for composing messages to potentially be sent, and a third portion configured to display an artificial intelligence control surface that comprises a plurality of user-selectable tiles, the plurality of user-selectable tiles respectively corresponding to the plurality of available control actions, wherein a first user-selectable tile of the plurality of user-selectable tiles includes content automatically generated by the artificial intelligence system based on a received message displayed in the first portion;

based on detecting a first type of a user touch action selecting the first user-selectable tile of the plurality of user-selectable tiles within the third portion of the user interface, generating, by the one or more computing devices, at least one additional user-selectable tile for display within the third portion of the user interface, the at least one additional user-selectable tile being displayed together with the first user-selectable tile within the third portion of the user interface and at a location proximate to the first user-selectable tile; and based on detecting a second type of a user touch action selecting the first user-selectable tile, inserting, by the one or more computing devices, the content from the first user-selectable tile into the data entry field provided within the second portion of the user interface to form part of a message to potentially be sent, wherein generating the at least one additional user-selectable tile comprises inputting at least one characteristic of the first user-selectable tile into the artificial intelligence system as further context data, and receiving, as a further output of the artificial intelligence system, further data descriptive of at least one further available control action available for performance by the artificial intelligence system, the at least one additional user-selectable tile corresponding to the at least one further available control action.

18. The method of claim 17, wherein providing, by the one or more computing devices, the plurality of user-selectable tiles comprises displaying the plurality of user-selectable tiles in a scrollable control surface hyperplane that virtually extends beyond a viewable area of the user interface, wherein the plurality of user-selectable tiles are arranged in the scrollable control surface hyperplane based on respective confidences associated with the plurality of user-selectable tiles.

19. The method of claim 17, wherein
the first user-selectable tile includes a first textual description for a first text object,
the at least one characteristic of the first user-selectable tile includes at least a portion of the first textual description for the first text object and a type of the first text object,
the at least one additional user-selectable tile includes a second textual description for a second text object and has a similar or same type as the first text object, and based on detecting the second type of the user touch action selecting the at least one additional user-selectable tile, inserting, by the one or more computing devices, the second textual description from the at least one additional user-selectable tile into the data entry field provided within the second portion of the user interface.

20. One or more non-transitory computer-readable media that collectively store instructions that, when executed by one or more processors, cause a computing system to perform operations, the operations comprising:

obtaining context data;

inputting the context data into an artificial intelligence system that comprises one or more machine-learned models, the artificial intelligence system configured to receive the context data and, based on receipt of the context data, output data descriptive of a plurality of available control actions available for performance by the artificial intelligence system on behalf of a user of the computing system;

receiving, as an output of the artificial intelligence system, the data descriptive of the plurality of available control actions available for performance by the artificial intelligence system;

providing a user interface for display to a user, wherein the user interface includes a first portion configured to display received messages and sent messages, a second portion configured to display a data entry field for composing messages to potentially be sent, and a third portion configured to display an artificial intelligence control surface that comprises a plurality of user-selectable tiles, the plurality of user-selectable tiles respectively corresponding to the plurality of available control actions, wherein a first user-selectable tile of the plurality of user-selectable tiles includes content automatically generated by the artificial intelligence system based on a received message displayed in the first portion;

based on detecting a first type of a user touch action selecting the first user-selectable tile of the plurality of user-selectable tiles within the third portion of the user interface, generating at least one additional user-selectable tile for display within the third portion of the user interface, the at least one additional user-selectable tile being displayed together with the first user-selectable tile within the third portion of the user interface and at a location proximate to the first user-selectable tile; and based on detecting a second type of a user touch action selecting the first user-selectable tile, inserting the content from the first user-selectable tile into the data entry field provided within the second portion of the user interface to form part of a message to potentially be sent, wherein generating the at least one additional user-selectable tile comprises inputting at least one characteristic of the first user-selectable tile into the artificial intelligence system as further context data, and receiving, as a further output of the artificial intelligence system, further data descriptive of at least one further available control action available for performance by the artificial intelligence system, the at least one additional user-selectable tile corresponding to the at least one further available control action.

* * * * *